United States Patent [19]

Eaton

[11] 4,151,028
[45] Apr. 24, 1979

[54] ALKANOLAMINE SALTS OF PHENOLIC RESINS

[75] Inventor: David C. Eaton, Manchester, England

[73] Assignee: Imperial Chemical Industries Limited, London, England

[21] Appl. No.: 935,612

[22] Filed: Aug. 21, 1978

[30] Foreign Application Priority Data

Aug. 19, 1977 [GB] United Kingdom ............... 34902/77

[51] Int. Cl.$^2$ .......................... B29H 5/02; C08G 8/14; C08G 8/22; C08G 14/06
[52] U.S. Cl. ...................... 156/110 MD; 156/110 A; 156/335; 260/29.3; 260/838; 260/842; 528/132; 528/151; 528/155
[58] Field of Search ....... 156/110 A, 110 R, 110 MD; 260/29.3, 838; 528/132, 151, 155

[56] References Cited

U.S. PATENT DOCUMENTS

| | | | |
|---|---|---|---|
| 2,878,198 | 3/1959 | Ingram et al. | 528/155 X |
| 3,069,374 | 12/1962 | Hunter | 156/110 A X |
| 3,660,202 | 5/1972 | Edington et al. | 260/838 X |
| 3,834,934 | 9/1974 | Broisman | 260/29.3 X |
| 3,855,168 | 12/1974 | Ozeki et al. | 528/151 X |
| 3,888,813 | 6/1975 | Moult et al. | 528/155 X |
| 3,981,760 | 9/1976 | Elmer | 156/110 A |
| 4,035,435 | 7/1977 | Rouzier | 528/151 X |

Primary Examiner—Howard E. Schain
Attorney, Agent, or Firm—Cushman, Darby & Cushman

[57] ABSTRACT

In the known process of co-use of a catechol-monophenol-formaldehyde condensation product and a "RFL" dip for bonding polyester fibres to the rubber in reinforced rubber articles, the use of the condensation product in the form of an alkanolamine salt instead of the ammonium salt, as hitherto used, leads to certain advantages. In addition to lowering a problem due to the evolution of ammonia fumes, there is on average a slight increase in bond strength and the compositions are more easily cleaned from the processing machinery used.

7 Claims, No Drawings

ALKANOLAMINE SALTS OF PHENOLIC RESINS

This invention relates alkanolamine salts of phenolic resins, more particularly with alkanolamine salts of resinous condensation products of formaldehyde with phenolic compounds.

TECHNICAL FIELD OF THE INVENTION

This invention relates to the industry concerned with reinforcement of rubber articles by the incorporation of polyester fibres bonded to the rubber.

BACKGROUND TO THE INVENTION

In the formation of polyester-reinforced rubber articles, a widely-used bonding agent for bonding the polyester to the rubber is the "RFL dip", comprising an aqueous mixture of a rubber latex and a condensation product of resorcinol and formaldehyde. The polyester fibre is dipped in this mixture, baked for a short period of time, brought into contact with a vulcanisable rubber composition, then the whole is subjected to vulcanisation conditions, the polyester becoming bonded to the rubber during the vulcanisation process.

In attempts to improve the bond strength between the polyester and the rubber, various proposals have been made to use this standard "RFL" dip treatment in combination with other treatments. One such method is described in UK Patent Specification No. 1140528 or the corresponding patents in other countries, e.g. U.S. Pat. No. 3660202 or Japanese Pat. No. 632024.

UK Specification No. 1140528 describes resinous condensation products of formaldehyde with certain monohydric phenols and certain dihydric phenols and their use in the bonding of polyester articles to rubber. For this purpose the condensation products are dissolved in aqueous ammonia and used in the form of the ammonium salts in conjunction with rubber latex and a formaldehyde-resorcinol condensation product, either in a two-stage or one-stage dipping process including a baking step.

In commercial practice it is found that the use of ammonia in this connection gives rise to objectionable fuming during all stages from opening the container to baking the film. It has now been found that certain amines can be substituted for the ammonia and the resultant salts used in a similar way to overcome the fume problem and to give additional advantages.

Thus according to the present invention there are provided salts of alkanolamines having alkanol residues of $C_2$ to $C_3$ and fusible substances having a molecular chain containing at least one each of the groups X—, —Y— and —Z—, connected by methylene groups, a molecular weight of at least 300, melting in the range 10° to 300° C. and having a solubility of at least 1% by weight in N aqueous ammonia at 25° C., wherein X and Z are the same of different divalent radicals of resorcinol or substituted resorcinols and Y is a monovalent radical of a monobromo- or monochlor-monohydroxybenzene, an alkylmonohydroxybenzene wherein the alkyl group is $C_1$–$C_5$ or a dichloro-, dibromo- or $C_1$–$C_5$ dialkyl-monohydroxybenzene in which at least two of the 2,4 and 6 positions, relative to the hydroxy group, are unsubstituted.

The alkanolamines used to prepare the above salts are preferably saturated, linear, branched or cyclic compounds containing at least one —$N.C_nH_{2n}$ group where n is 2 or 3, having a molecular weight up to about 300, and a boiling point of 150° C. to 350° C., preferably 165°–280° C.

As examples of these, there may be mentioned:
monoethanolamine
diethanolamine
triethanolamine
1-amino-2-hydroxypropane
1-amino-2,3-dihydroxypropane
N-(2-hydroxyethyl)-ethylenediamine
O-(2-aminoethyl)ethylene glycol
N,N-diethylaminoethanol
N-methyldiethanolamine
N,N'-bis(hydroxyethyl)piperazine.

The preferred alkanolamine is monoethanolamine.

The fusible substances defined in claim 1 of UK Specification No. 1140528 are condensation products of formaldehyde, certain monohydric phenols and certain dihydric phenols. A substantial proportion of the products are believed to be compounds of the formula $$X-CH_2-(Y-CH_2)_n-X$$

where X is dihydroxybenzene radical, Y is a monohydroxybenzene radical and n is an integer. Such compounds can form a series of salts because of the presence of 5 or more hydroxyl groups, and depending on the number of these neutralised by the alkanolamine.

The chemical constitution of the fusible substance can be varied by altering the resorcinol or substituted resorcinol and monohydroxybenzene used, also their ratio to each other; however, this has relatively small effect upon the bonding action of the product. The preferred resorcinol is resorcinol itself and the preferred monohydroxybenzenes are p-cresol or above all p-chlorophenol.

When using resorcinol and p-chlorophenol, particularly useful condensation products are those using from 1.0 to 2.0 moles of resorcinol per mole the p-chlorophenol. For economic rather than technical reasons it is preferable to use those obtained at the lower end of this range, e.g. from 1.0 to 1.5 moles of resorcinol per mole of p-chlorophenol.

In the present invention, the preferred salts are those containing 0.4 to 0.8 equivalents of the alkanolamine per hydroxyl group of the condensation product, that is to say that on average about two to four of the hydroxyl groups of pentahydric compounds (n=1) of the kind described above are converted to the salt form.

The alkanolamine salts can be prepared by adding the appropriate amount of alkanolamine to an aqueous suspension of the condensation product; suitable dispersions can contain from 1% to 50% by weight of the condensation product, but concentrations of from 10% to 25% by weight are preferred. Alternatively, the resin can be dissolved in an alkanolamine solution of suitable strength e.g. a solution of 2N or 3N ethanolamine is found to be suitable for preparing a 20% solution of the condensation product.

The resultant solutions can be converted to the dry salt by evaporation at moderate temperatures which avoid loss of the alkanolamine by vapourisation. The temperature which can be used in this connection will vary according to the boiling point of the alkanolamine used but is preferably at least 20° C. below the boiling point thereof.

However, for practical use in the bonding process of UK Specification No. 1140528, the aqueous solutions of resin can be stored for use directly in the bonding process. When used in this way, not only is the fume problem associated with ammonia overcome, but additional advantages are found in a greater ease of cleaning out the dip-baths and associated apparatus and frequently slightly higher bond strengths are obtained than from an ammoniacal solution. There appears to be little deleterious effect on the tensile strength of polyester cords as compared with the use of ammonia.

The use of the alkanolamine salts for improving the bonding of polyester shaped articles to rubber forms a further feature of the invention.

For this purpose, the salt may be added to a resorcinol-formaldehyde-latex dip commonly-used as described above, or may be applied to the polyester in a separate dipping operation, using an aqueous solution of the salt. The polyester coated with both salt and RFL dip is baked at a temperature from about 200° up to about 250° C., then brought into contact with an unvulcanised rubber mass and the whole is subjected to vulcanisation in the normal way.

The invention is illustrated by the following Examples in which parts and percentages are by weight.

EXAMPLE 1

20 Parts of a condensation product of p-chlorophenol, formaldehyde and resorcinol, obtained as described below, were dissolved in 80 parts of 3N aqueous ethanolamine solution. The resulting orange-red solution was used to bond polyester cords to rubber as described in Example 2.

Preparation of the condensation product

4-Chlorophenol (50 parts), aqueous sodium hydroxide solution (s.g. 1.30, 56.8 parts) and water (95 parts) were stirred to 60°-65° C. to give a solution. Formaldehyde solution (36.5%, 60.8 parts) was added over 1½ hours at the same temperature and the mixture was heated to 80° C. for 1 hour and cooled to 45° C. With stirring maintained, resorcinol (51.3 parts), concentrated sulphuric acid (29.8 parts) and water (70 parts) were added and the mixture was stirred and heated for 5 hours at 95° C. The mixture was then cooled to room temperature and the solid resin filtered off, washed with water and dried.

EXAMPLE 2

The condensation product described in Example 1 (20 parts) was dissolved in 80 parts of 3N aqueous diethanolamine solution.

EXAMPLE 3

The condensation product described in Example 1 (20 parts) was dissolved in 80 parts of 3N aqueous triethanolamine solution.

EXAMPLE 4

4-Chlorophenol (50 parts), aqueous sodium hydroxide solution (s.g. 1.30, 55.5 parts) and water (95 parts) were stirred at 60°-65° C. until dissolved. Formaldehyde solution (17.0%, 130.8 parts) was added over 1½ hours at the same temperature. The mixture was then heated to 80° C. for 1 hour and cooled to 45° C. With stirring maintained, resorcinol (77 parts), concentrated sulphuric acid (96%, 30.15 parts) and water (70 parts) were added and the mixture was stirred and heated for 4 hours at 95° C. The mixture was then cooled to room temperature and the solid resin filtered off, washed with water and dried.

20 Parts of this product were dissolved in 80 parts of 3N aqueous ethanolamine.

EXAMPLE 5 p-Chlorophenol (128.5 parts) was dissolved in a solution of caustic soda (40.4 parts) in water (240 parts). Formaldehyde solution (37%, 164 parts) was added and the reaction mixture stirred and heated to 78°-82° C. and maintained at this temperature for 1¼ hours. The mixture was then cooled to 25° C. and sulphuric acid (5N, 230 parts) gradually added with stirring and cooling to maintain the temperaure below 25° C. After completion of the addition the pH of the mixture lay in the range 8.0 to 8.5. The precipitate which formed was filtered off and washed with water. The damp filter cake (50% solids content) was slurred with water (418 parts), sulphuric acid (98%, 15.5 parts) and resorcinol (179 parts). The resultant mixture was stirred and heated at 98°-102° C. for 2 hours, cooled to room temperature and the solid condensation product filtered off, washed with water and dried.

20 parts of the dried product were dissolved in 80 parts of 3N aqueous ethanolamine.

EXAMPLE 6

Preparation of Condensation Product and Solution

A mixture of 2,6-bis(hydroxymethyl)-p-cresol (115 parts), sodium hydroxide (41.1 parts), water (510 parts) and 2-ethoxyethanol (200 parts) is stirred at 45° C. A solution of resorcinol (90.3 parts), water (175 parts) and sulphuric acid (98%, 72.2 parts) is added to the mixture with stirring, and heated to 95° C. After heating and stirring for 4 hours at 93°-97° C., the mixture is cooled and the solid condensation product isolated by filtration, washed acid free with water and dried at 50° C. in vacuo.

The condensation product (15 parts) thus obtained is dissolved in 85 parts of 3N aqueous monoethanolamine to give a brown solution containing 15% by weight of solids.

EXAMPLE 7

Preparation of Condensation Product and Solution

To a solution of 2,6-bis(hydroxymethyl)-p-cresol (168 parts), water (745 parts), 2-ethoxyethanol (292 parts) and sodium hydroxide (40 parts) is aded with stirring at 45° C. a solution of resorcinol (220 parts) in water (428 parts) and sulphuric acid (98%, 70.3 parts). The mixture is then stirred and heated for 4 hours at 93°-97° C., cooled, and the solid condensation product isolated by filtration, washing acid free with water and drying at 50° C. in vacuo.

The condensation product (20 parts) thus obtained is dissolved in 80 parts of 2N aqueous monoethanolamine to give a brown solution containing 20% by weight of solids.

Use of the alkanolamine salts

A standard resorcinol-formaldehyde-latex (RFL) dip was prepared as follows:

A mixture of 50 parts of resorcinol, 28 parts of 37% formaldehyde solution and 120 parts of water was stood at 25° C. for 1 hour then added to a mixture of 182 parts of water and 620 parts of a vinyl pyridine latex, commercially available under the trade name Intex 181 (International Synthetic Co.Ltd.).

160 parts of the mixture, 160 parts of the solution of Example 1 and 80 parts of water were mixed together and 2×1100 decitex polyester cord dipped in the mixture and baked at 235° C. for 1 minute.

The cords were then moulded into a rubber compound prepared by mixing the ingredients below on a two roll mill and the whole was then vulcanised by heating at 153° C. for 30 minutes.

Natural rubber smoked sheet: 100
Zinc oxide: 3.5
Stearic acid: 1.5
General Processing Furnace Black: 35
Process oil: 3.0
Benzthiazyl sulphenyl cyclohexylamide: 1.0
Sulphur: 2.5 using an H-type test-piece the rubber/cord bond strength was found to be 12.1 kg.

Following the above procedure but using a 20% solution of the resin in 3N ammonia in place of ethanolamine, the rubber/cord bond strength was found to be 11.3 kg.

Test results for the products of Examples 2 to 5, obtained in a similar way, were:
Example 2: 11.7 kg
Example 3: 12.7 kg
Example 4: 12.7 kg
Example 5: 10.1 kg in each case, the corresponding ammonium salt was prepared and found to give a bond strength of 9.6 kg.

I claim:

1. Salts of alkanolamines having alkanol residues of $C_2$ to $C_3$ and fusible substances having a molecular chain containing at least one each of the groups X—, —Y— and —Z, connected by methylene groups, a molecular weight of at least 300, melting in the range 10° to 300° C. and having a solubility of at least 1% by weight in N aqueous ammonia at 25° C., wherein X and Z are the same or different divalent radicals of resorcinol or substituted resorcinols and Y is a monovalent radical of a monobromo- or monochloro-monohydroxybenzene, an alkyl monohydroxybenzene wherein the alkyl group is $C_1$–$C_5$ or a dichloro-, dibromo- or $C_1$–$C_5$-dialkyl-monohydroxybenzene in which at least two of the 2, 4 and 6 positions, relative to the hydroxy group, are unsubstituted.

2. Salts as claimed in claim 1 wherein the radicals X and Z are each a radical of resorcinol.

3. Salts as claimed in claim 1 or claim 2 wherein Y is the radical of p-cresol or p-chlorophenol.

4. Salts as claimed in any of claim 1 to 3 wherein the alkanolamine is a saturated linear, branched or cyclic compound containing at least one —$N.C_nH_{2n}OH$ group where n is 2 or 3, having a molecular weight of up to 300 and a boiling point of 165° to 280° C.

5. Salts as claimed in claim 4 wherein the alkanolamine is monoethanolamine.

6. Process for the manufacture of salts as defined in claim 1, which comprises contacting an aqueous suspension of a fusible substance defined in claim 1 with an alkanolamine.

7. The use of a resorcinol-formaldehyde-latex (RFL) dip for coating polyester fibres in the formation of polyester fibre-reinforced rubber articles, characterised in that a salt as defined in claim 1 is added to the RFL dip or is applied to the polyester fibre separately from an aqueous bath prior to contacting the fibre with the rubber.

* * * * *

UNITED STATES PATENT AND TRADEMARK OFFICE
CERTIFICATE OF CORRECTION

PATENT NO. : 4,151,028
DATED : April 24, 1979
INVENTOR(S) : David C. EATON

It is certified that error appears in the above–identified patent and that said Letters Patent are hereby corrected as shown below:

In the heading of the patent:

Item [73] should read

--[73] Assignee: Vulnax International Limited, Manchester, England--

Signed and Sealed this

Twenty-third Day of October 1979

[SEAL]

Attest:

RUTH C. MASON
Attesting Officer

LUTRELLE F. PARKER
Acting Commissioner of Patents and Trademarks